United States Patent
Mizoguchi

(10) Patent No.: US 9,599,811 B2
(45) Date of Patent: Mar. 21, 2017

(54) OPTICAL DEVICE AND IMAGE DISPLAY DEVICE

(71) Applicant: Seiko Epson Corporation, Tokyo (JP)

(72) Inventor: Yasushi Mizoguchi, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/859,759

(22) Filed: Sep. 21, 2015

(65) Prior Publication Data

US 2016/0094819 A1    Mar. 31, 2016

(30) Foreign Application Priority Data

Sep. 30, 2014  (JP) ................................ 2014-202405

(51) Int. Cl.
   *G02B 26/08*   (2006.01)
   *H04N 9/31*    (2006.01)

(52) U.S. Cl.
   CPC ......... *G02B 26/08* (2013.01); *G02B 26/0875* (2013.01); *H04N 9/3105* (2013.01); *H04N 9/3188* (2013.01)

(58) Field of Classification Search
   CPC .. G02B 26/085; G02B 26/08; G02B 26/0816; G02B 26/0875; H04N 9/3105; H04N 9/3188; H02K 11/215; H02K 33/00; H02K 35/02; H02K 35/04
   USPC ........................................... 359/199.3, 200.7
   See application file for complete search history.

(56) References Cited

U.S. PATENT DOCUMENTS

2011/0234650 A1    9/2011  Watanabe
2014/0022655 A1*   1/2014  Cheng .................. G02B 6/4457
                                                         359/824

FOREIGN PATENT DOCUMENTS

JP    2011-158589 A    8/2011
JP    2011-203460 A    10/2011

* cited by examiner

*Primary Examiner* — James Phan
(74) *Attorney, Agent, or Firm* — Harness, Dickey & Pierce, P.L.C.

(57) ABSTRACT

An optical device includes: an optical section that includes a light-incident surface on which light is incident; a moving section that supports the optical section; a shaft section that swingably supports the moving section around a swing axis; a permanent magnet that is provided in the moving section; an air core coil that is provided so as to face the moving section, and generates an electric field acting on the permanent magnet; and a coil holding member that is provided on a side opposite to the permanent magnet of the air core coil, and holds the air core coil, wherein the coil holding member includes a window section, and wherein an edge section of the air core coil is viewable through the window section.

16 Claims, 11 Drawing Sheets

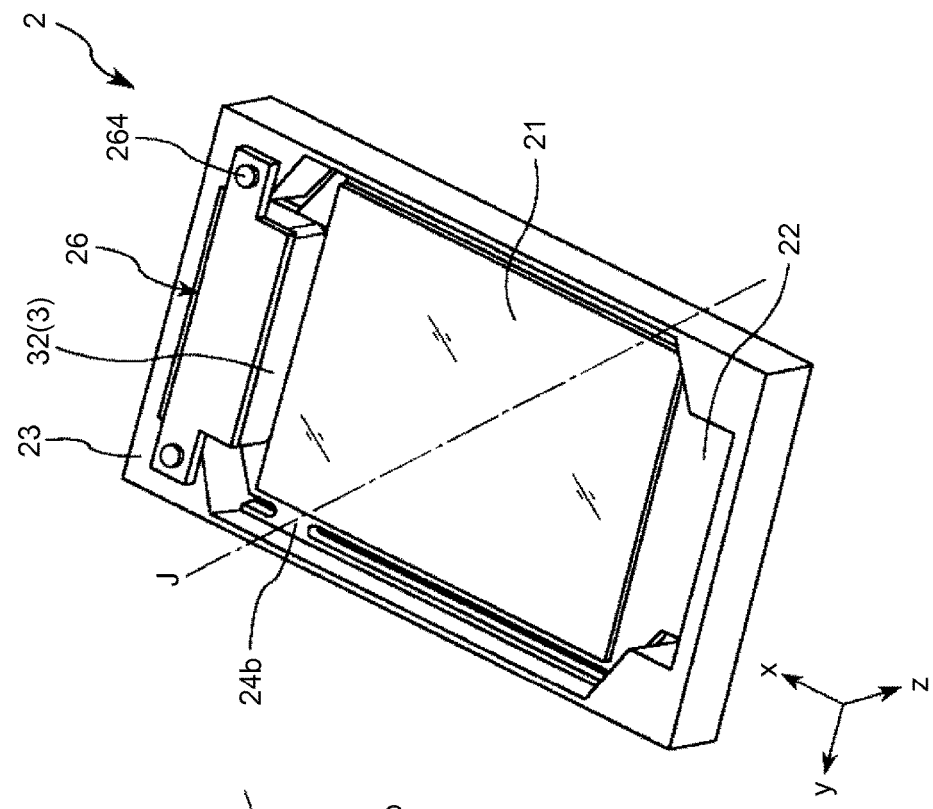
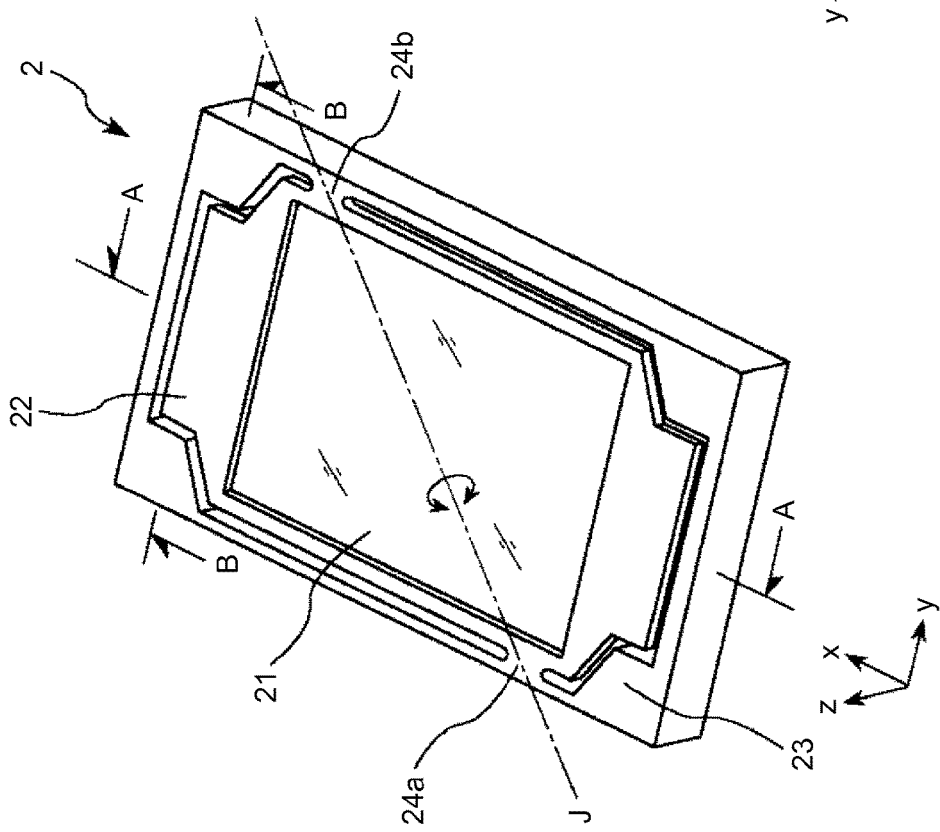
FIG. 4A
FIG. 4B

OPTICAL DEVICE AND IMAGE DISPLAY DEVICE

BACKGROUND

1. Technical Field

The present invention relates to an optical device and an image display device.

2. Related Art

A technology in which, in order to increase the resolution of an image to be projected more than the resolution of an optical modulation device of a liquid crystal panel or the like, an axis of an image light emitted from the optical modulation device is shifted, is known from the related art. In addition, an optical path control device described in JP-A-2011-158589 is known as a device which shifts an axis of an image light.

The optical path control device described in JP-A-2011-158589 includes a glass plate, a moving section that holds the glass plate, a support section that supports the moving section, and a pair of plate springs that couples the moving section to the support section. Posture of the glass plate is changed by swinging (rotating) a retention member by using the plate spring as a rotation axis, and thereby light (image light) which is incident on the glass plate is deflected, and the axis is shifted.

In addition, the optical path control device described in JP-A-2011-158589 includes a drive source for swinging the retention member. The drive source includes a permanent magnet, a coil provided on the retention member, a drive circuit that is electrically coupled to the coil, and a yoke configured by a U-shaped soft magnetic material having one end disposed on the coil side and having the other end disposed on the permanent magnet side.

However, in the optical device described in JP-A-2011-158589, the yoke configured by the soft magnetic material is not transparent, and thus when the optical path control device is assembled, the coil and the permanent magnet are hardly visible through the yoke. For this reason, when the moving section swings, it is difficult to provide the coil and the permanent magnet in a suitable position in which the coil and the permanent magnet do not come into contact with each other. As a result, when swinging, the coil comes into contact with the permanent magnet, and thereby stability of the swinging of the moving section may decrease.

SUMMARY

An advantage of some aspects of the invention is to provide an optical device which can grasp a positional relationship between a permanent magnet and an air core coil and in which the air core coil can be disposed in a desired position, and an image display device including the optical device.

The object is achieved by the following aspects of the invention.

An optical device according to an aspect of the invention includes: an optical section that includes a light-incident surface on which light is incident; a moving section that supports the optical section; a shaft section that swingably supports the moving section around a swing axis; a permanent magnet that is provided in the moving section; an air core coil that is provided so as to face the moving section, and generates an electric field acting on the permanent magnet; and a coil holding member that is provided on a side opposite to the permanent magnet of the air core coil, and holds the air core coil, in which the coil holding member includes a window section, and in which an edge section of the air core coil is viewable through the window section.

With this configuration, a position of the air core coil can be confirmed through the window section, and thus when the optical device is assembled, for example, when the moving section swings, the air core coil can be disposed in a suitable position in which the air core coil and the permanent magnet do not come into contact with each other. For this reason, when swinging, it is possible to prevent the permanent magnet from coming into contact with the air core coil, and thus stability of the swinging of the moving section can be increased. For this reason, it is possible to provide an optical device with high stability of an optical path. In addition, since the position of the air core coil can be grasped by a relatively simple configuration in which a window section is provided, the time required for disposing the air core coil can be reduced, and as a result, it is possible to increase productivity of the optical path deflecting element.

In the optical device, it is preferable that the air core coil has an outer shape of a rectangular shape in a planar view, and the window section is provided in a position in which an angle section of the air core coil is viewable through the window section.

With this configuration, it is easier to grasp the position of the air core coil through the window section, and to dispose the air core coil to a desired position.

An optical device according to another aspect of the invention includes: an optical section that includes a light-incident surface on which light is incident; a moving section that supports the optical section; a shaft section that swingably supports the moving section around a swing axis; a permanent magnet that is provided in the moving section; an air core coil that is provided so as to face the moving section, and generates an electric field acting on the permanent magnet; and a coil holding member that is provided on a side opposite to the permanent magnet of the air core coil, and holds the air core coil, in which the moving section includes a window section, and in which an edge section of the permanent magnet is viewable through the window section.

With this configuration, the position of the permanent magnet can be confirmed through the window section, and thus when the optical device is assembled, for example, when the moving section swings, the air core coil can be disposed in a suitable position in which the permanent magnet and the air core coil do not come into contact with each other. For this reason, when swinging, it is possible to prevent the permanent magnet from coming into contact with the air core coil, and thus stability of the swinging of the moving section can be increased. For this reason, it is possible to provide an optical device with high stability of an optical path. In addition, since the position of the permanent magnet can be grasped by a relatively simple configuration in which a window section is provided, the time required for disposing the air core coil can be reduced, and as a result, it is possible to increase productivity of the optical path deflecting element.

In the optical device, it is preferable that the permanent magnet has an outer shape of a rectangular shape in a planar view, and the window section is provided in a position in which an angle section of the permanent magnet is viewable through the window section.

With this configuration, it is easier to grasp the position of the permanent magnet through the window section, and to dispose the air core coil to a desired position.

In the optical device, it is preferable that the window section is provided in a position in which a positional relationship between the permanent magnet and the air core coil is graspable through the window section.

With this configuration, it is possible to more easily and reliably dispose the air core coil to a desired position.

In the optical device, it is preferable that the window section is a penetration hole.

With this configuration, it is particularly easy to form the window section for confirming the position of the air core coil or the permanent magnet.

In the optical device, it is preferable that a plurality of the window sections is provided.

With this configuration, since it is possible to view a plurality of portions of the air core coil or the permanent magnet through the window section, it is easier to dispose the air core coil to a desired position.

In the optical device, it is preferable that the plurality of the window sections are provided in positions through which sections different from one another are viewable.

With this configuration, it is easier to grasp the position of the air core coil or the permanent magnet, and to dispose the air core coil to a desired position.

In the optical device, it is preferable that the coil holding member is made of a non-magnetic material.

With this configuration, it is possible to prevent the coil holding section from being hindered by the drive force which is generated by the action of the air core coil and the permanent magnet.

In the optical device, it is preferable that each of the moving section and the shaft section includes a resin material.

With this configuration, modulus of elasticity of the moving section and the shaft section can be reduced, and thus, it is possible to suppress stress applied to the shaft section leading to unwanted vibration of the optical section, when the moving section changes a posture.

In the optical device, it is preferable that the optical section has light-transmitting property.

With this configuration, by changing the posture of the optical section, it is possible to change an axis of light which passes through the optical section.

An image display device according to still another aspect of the invention includes: the optical device according to the aspect.

With this configuration, it is possible to provide an image display device in which stability of an optical path is increased and which has a high resolution.

In the image display device, it is preferable that light is spatially modulated by the optical device, and a position of a pixel that is displayed by irradiation of the light is shifted.

With this configuration, appearance of the pixels can be increased, and resolution of the image is increased.

BRIEF DESCRIPTION OF THE DRAWINGS

The invention will be described with reference to the accompanying drawings, wherein like numbers reference like elements.

FIGS. 4A and 4B are perspective views of an optical path deflecting element having the projector (image display device) illustrated in FIG. 1.

DESCRIPTION OF EXEMPLARY EMBODIMENTS

Hereinafter, an optical device and an image display device according to the invention will be described in detail based on each embodiment illustrated in the accompanying drawings.

First Embodiment

Figure 1:
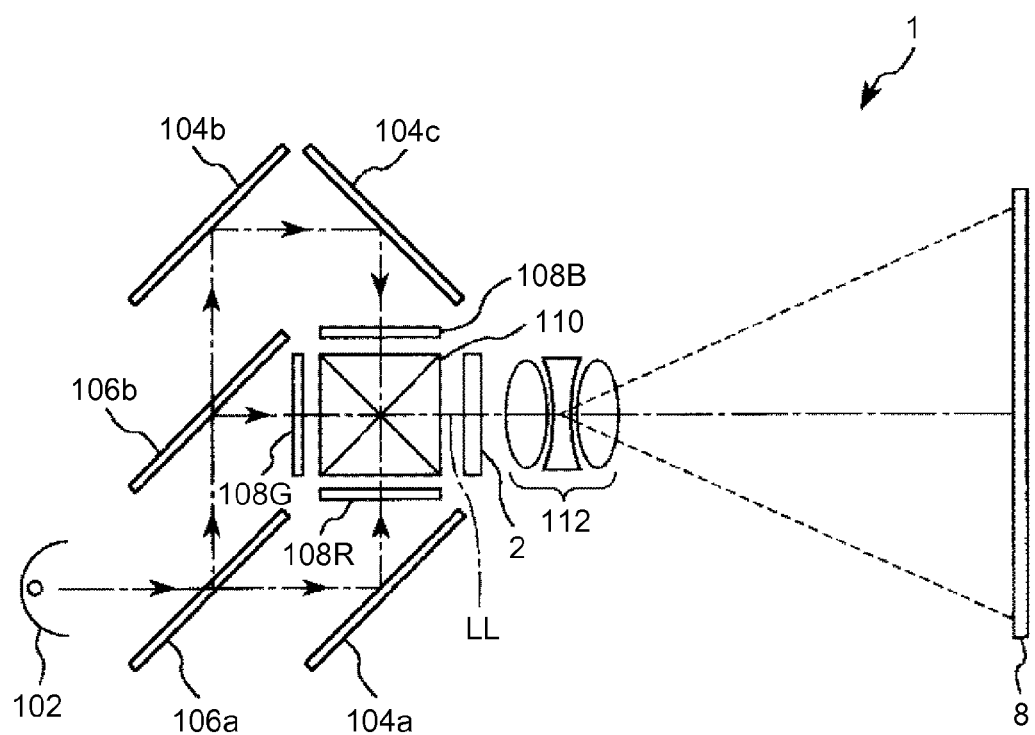
FIG. 1 is a view illustrating an optical configuration of a projector (image display device) according to a first embodiment of the invention.
Figure 2:
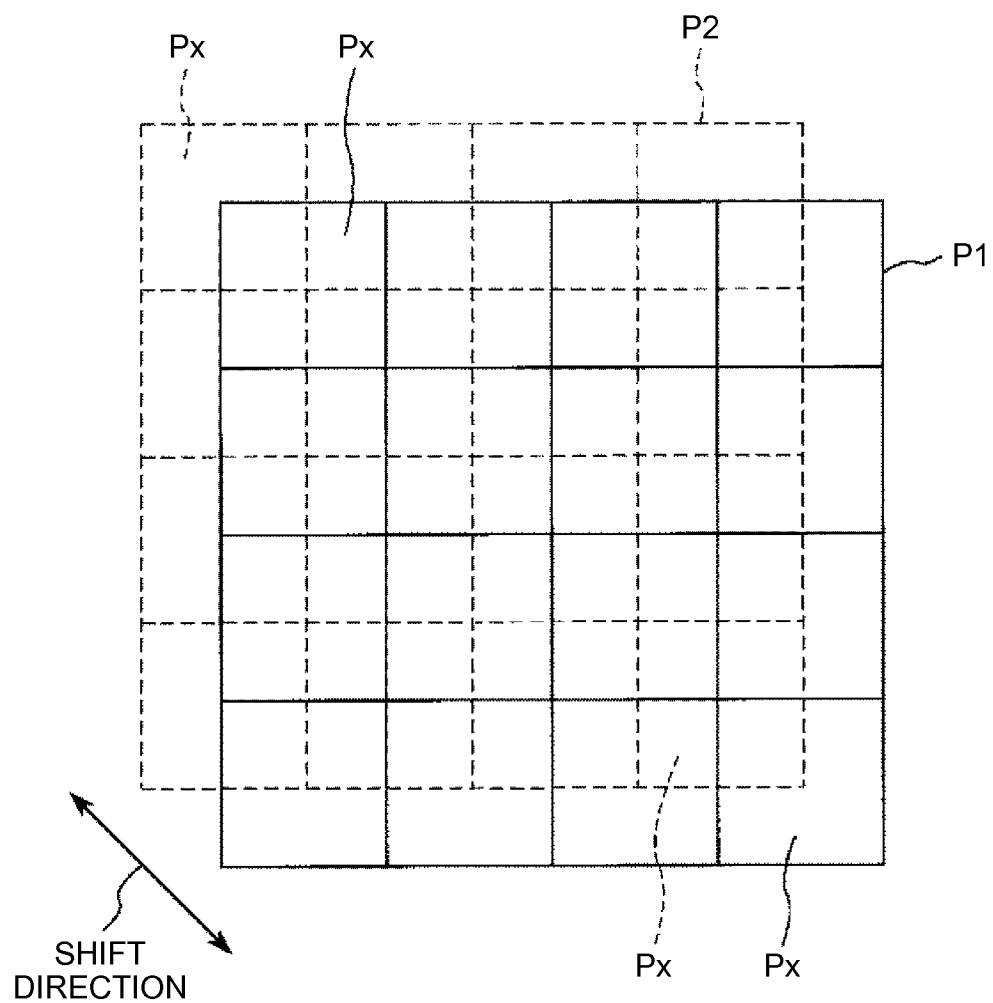
FIG. 2 is a diagram illustrating a state in which image light is shifted.
Figure 3:
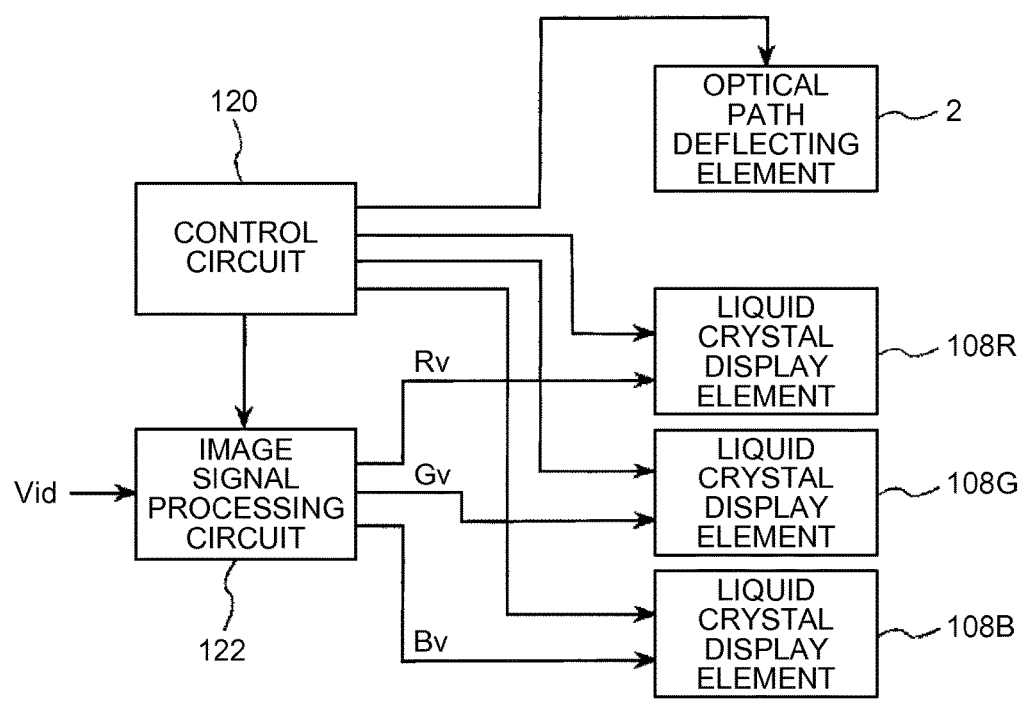
FIG. 3 is a block diagram illustrating an electrical configuration of the projector (image display device) illustrated in FIG. 1.
Figure 5A:
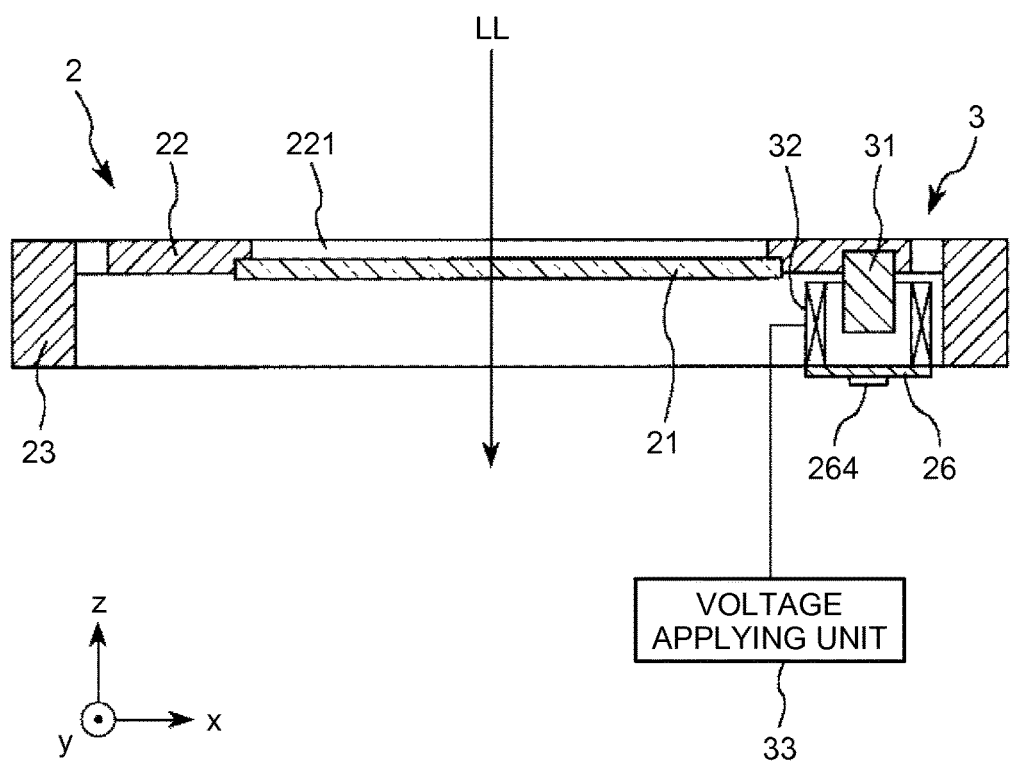
FIGS. 5A and 5B are respectively a cross-sectional view taken along line A-A illustrated in FIG. 4A and a cross-sectional view taken along line B-B illustrated in FIG. 4A.
Figure 5B:
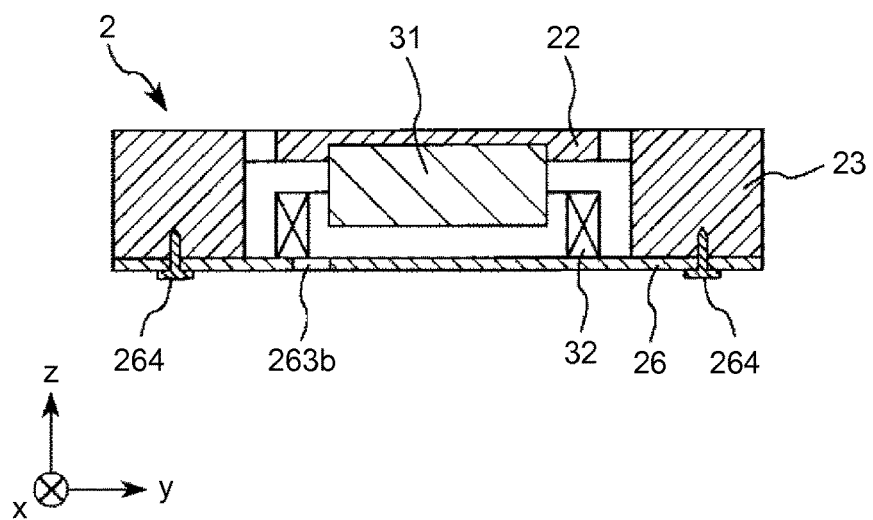
Figures 6A, 6B:
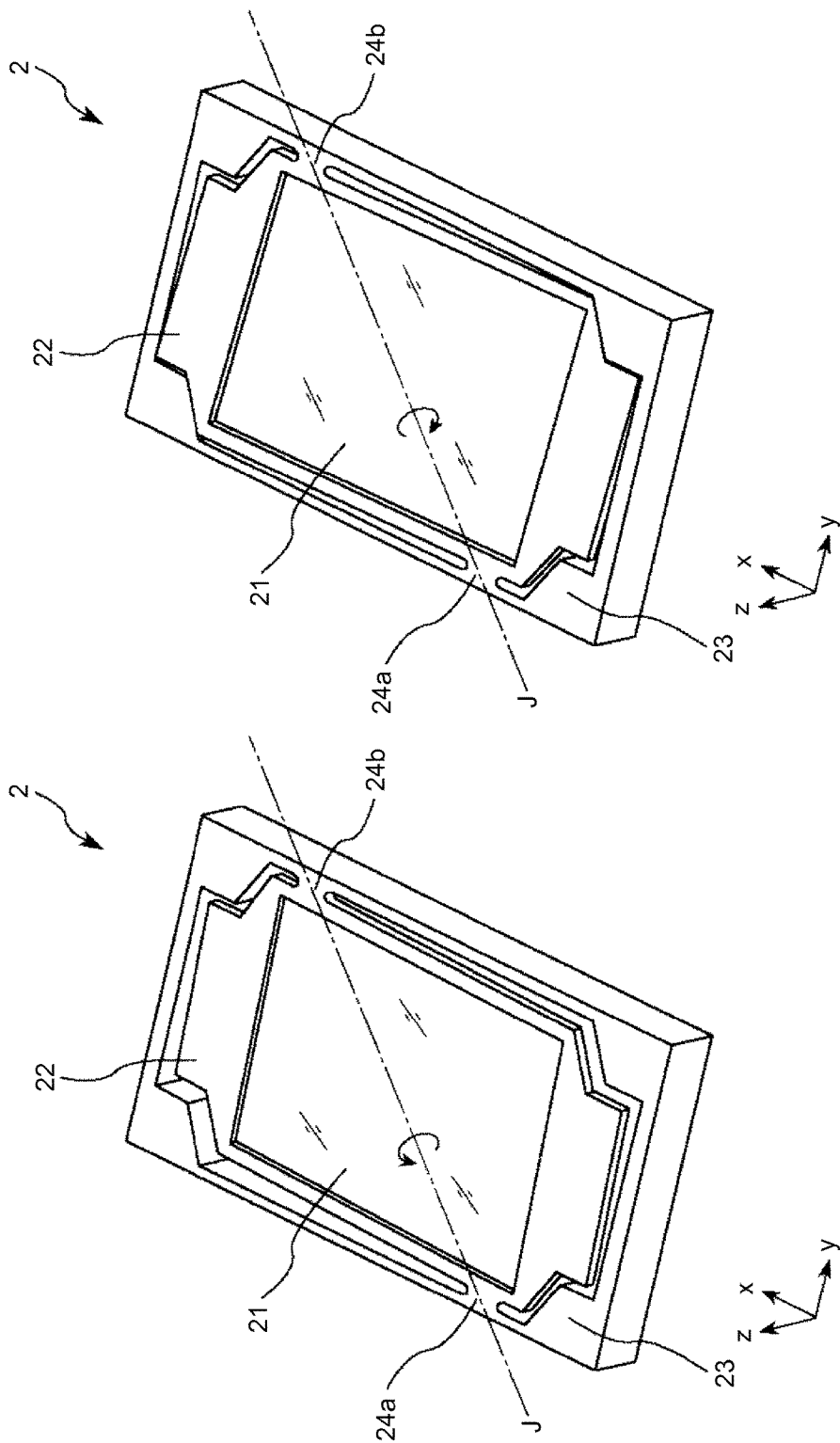
FIGS. 6A and 6B are perspective views illustrating an operation of the optical path deflecting element illustrated in FIGS. 4A and 4B.
Figure 7:
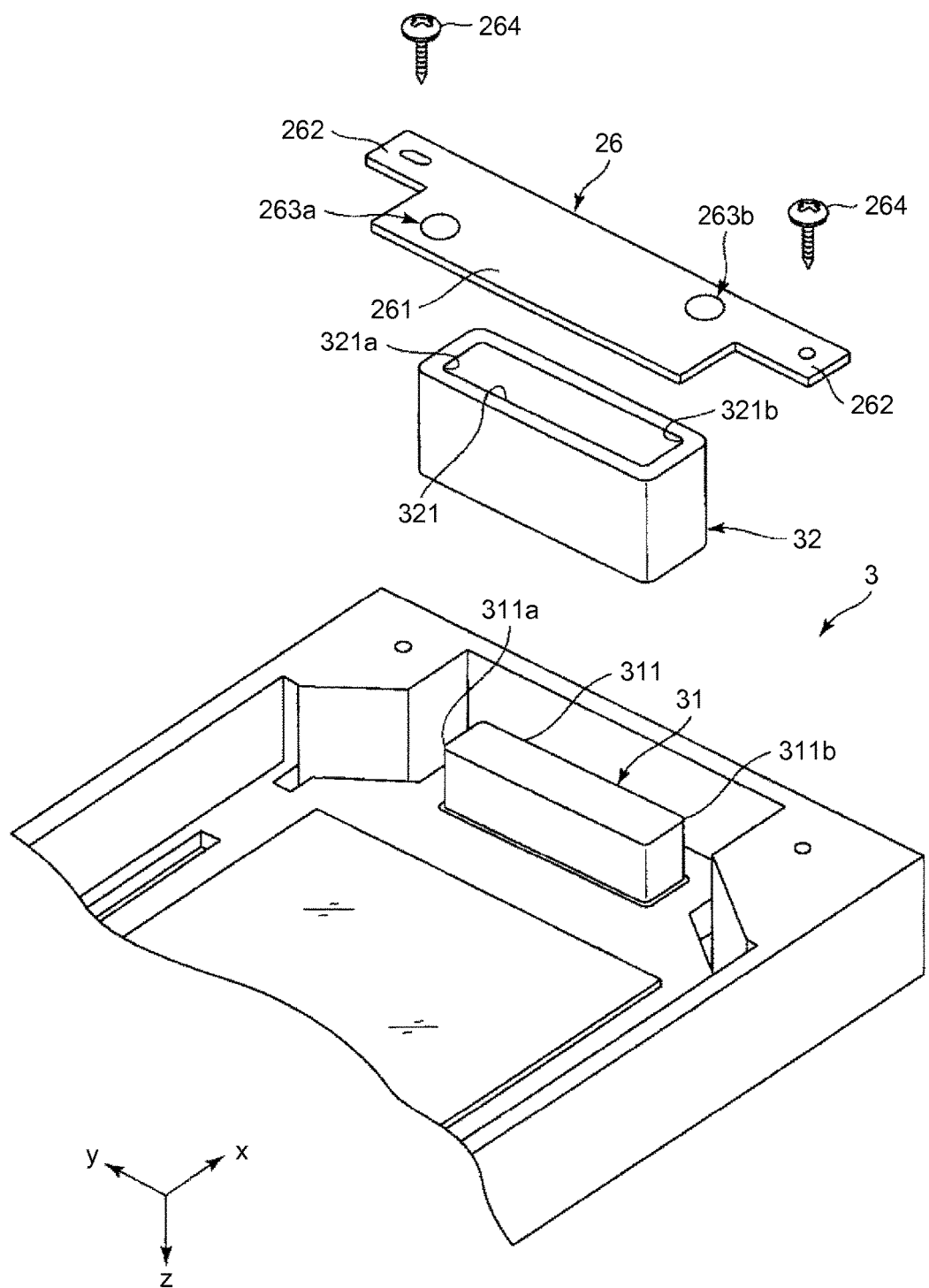
FIG. 7 is a partially exploded perspective view which is viewed from a rear surface side of the optical path deflecting element illustrated in FIG. 4A or 4B.
Figure 8:
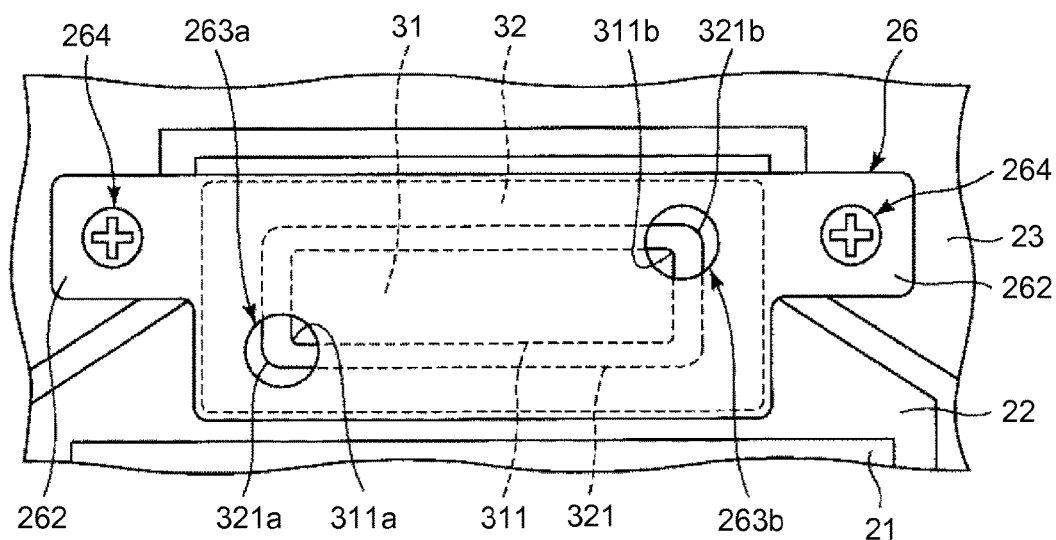
FIG. 8 is a partially enlarged plan view (rear view) of the optical path deflecting element illustrated in FIGS. 4A and 4B.
Figure 8:
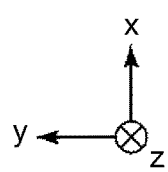
Figure 9:
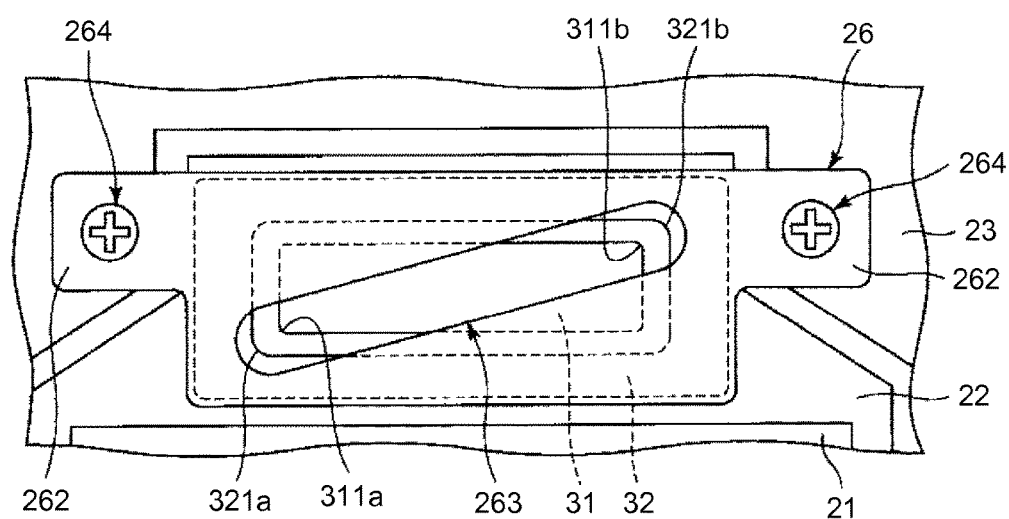
FIG. 9 is a view illustrating a modification example of a support section illustrated in FIG. 8.
Figure 9:
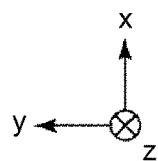

FIG. 1 is a view illustrating an optical configuration of a projector (image display device) according to a first embodiment of the invention. FIG. 2 is a diagram illustrating a state in which image light is shifted. FIG. 3 is a block diagram illustrating an electrical configuration of the projector (image display device) illustrated in FIG. 1. FIGS. 4A and 4B are perspective views of an optical path deflecting element having the projector (image display device) illustrated in FIG. 1. FIGS. 5A and 5B are respectively a cross-sectional view taken along line A-A illustrated in FIG. 4A and a cross-sectional view taken along line B-B illustrated in FIG. 4A. FIGS. 6A and 6B are perspective views illustrating an operation of the optical path deflecting element illustrated in FIGS. 4A and 4B. FIG. 7 is a partially exploded perspective view which is viewed from a rear surface side of the optical path deflecting element illustrated in FIG. 4A or 4B. FIG. 8 is a partially enlarged plan view (rear view) of the optical path deflecting element illustrated in FIGS. 4A and 4B. FIG. 9 is a view illustrating a modification example of a support section illustrated in FIG. 8.

For convenience of description, FIG. 4A to FIG. 9 illustrate three axes, which are orthogonal to each other, of an x-axis, a y-axis, and a z-axis. Front end sides of arrows illustrated in the figures will be referred to as "+side", and a base end side will be referred to as "−side". Hereinafter, a direction parallel to the x-axis will also be referred to as "x-axis direction", a direction parallel to the y-axis will also be referred to as "y-axis direction", a direction parallel to the z-axis will also be referred to as "z-axis direction", a +z side will be referred to as "top", and a −z side will be referred to as "bottom".

1. Projector

A projector (image display device) 1 illustrated in FIG. 1 is a so-called "liquid crystal projector". As illustrated in FIG. 1, the projector 1 includes a light source 102, mirrors 104A, 104B, and 104C, dichroic mirrors 106A and 106B, liquid crystal display elements 108R, 108G, and 108B, a dichroic prism 110, an optical path deflecting element (optical device) 2, and a projection lens system 112.

A halogen lamp, a mercury lamp, a light emitting diode (LED), or the like is used as the light source 102. In addition, an element that emits white light is used as the light source 102. Light which is emitted from the light source 102 is divided into red light (R) and the other light by the dichroic mirror 106A. The red light is reflected by the mirror 104A, and then is incident on the liquid crystal display element 108R. The other light is further divided into green light (G) and blue light (B) by the dichroic mirror 106B. The green light is incident on the liquid crystal display element 108G. The blue light is reflected by the mirrors 104B and 104C, and then is incident on the liquid crystal display element 108B.

The liquid crystal display elements 108R, 108G, and 108B are respectively used as spatial light modulators. The liquid crystal display elements 108R, 108G, and 108B are spatial light modulators of a transmission type respectively corresponding to primary colors of R, G, and B, and include pixels arranged in a matrix of, for example, vertical 1080 rows and horizontal 1920 columns. In each pixel, an amount of transmitted light with respect to the incident light is adjusted, and the light amount distribution of all pixels in the liquid crystal display elements 108R, 108G, and 108B is cooperatively controlled. Lights which are respectively and spatially modulated by the liquid crystal display elements 108R, 108G, and 108B are synthesized by the dichroic prism 110, and image light LL of a full color is emitted from the dichroic prism 110. The emitted image light LL is expanded by the projection lens system 112 and is projected onto a screen 8.

Here, the projector 1 includes the optical path deflecting element 2 between the dichroic prism 110 and the projection lens system 112. The projector 1 shifts (a so-called "pixel shift" is performed) an optical axis of the image light LL using the optical path deflecting element 2, thereby being able to project an image with a resolution (4$k$ if the liquid crystal display elements 108R, 108G, and 108B have full high definition) higher than the resolution of the liquid crystal display elements 108R, 108G, and 108B onto the screen 8. This principle will be simply described by using FIG. 2. The optical path deflecting element 2 includes a glass plate 21 through which the image light LL passes through, and by changing the posture of the glass plate 21, an optical axis of the image light LL can be shifted. The projector 1 is configured, in such a manner that the image display position P1 in a case in which the optical axis of the image light LL is shifted on one side, and the image display position P2 in a case in which the optical axis of the image light LL is shifted on the other side, are shifted by half of a pixel (that is, half of the pixel Px) in a diagonal direction (arrow direction in FIG. 2), using the shift of the optical axis. The projector 1 alternately displays images on the image display positions P1 and P2, and thus pixels increase in appearance, and a high resolution of the image which is projected onto the screen 8 is achieved. An amount of shift of the image display positions P1 and P2 is not limited to half of the pixel, and may be a quarter of the pixel Px or one eighth of the pixel Px.

The projector 1 having the configuration described above includes a control circuit 120 and an image signal processing circuit 122, as illustrated in FIG. 3, in addition to the optical path deflecting element 2 or each of liquid crystal display elements 108R, 108G, and 108B which are described above. The control circuit 120 controls a write operation of a data signal to the liquid crystal display elements 108R, 108G, and 108B, an optical path deflecting operation of the optical path deflecting element 2, a data signal generating operation of the image signal processing circuit 122, and the like. Meanwhile, the image signal processing circuit 122 divides an image signal Vid which is supplied from an external device, not illustrated, into three primary colors of R, G, and B, and converts the primary colors into data signals Rv, Gv, and Bv suitable for operations of the respective liquid crystal display elements 108R, 108G, and 108B. The converted data signals Rv, Gv, and Bv are supplied to the liquid crystal display elements 108R, 108G, and 108B, and thereby the liquid crystal display elements 108R, 108G, and 108B operate.

2. Optical Path Deflecting Element

Next, the optical path deflecting element 2 included in the above-described projector 1 will be described in detail.

As described in FIGS. 4A and 4B and FIGS. 5A and 5B, the optical path deflecting element 2 includes an moving section 22 in which the glass plate (optical section) 21 that has light-transmitting property and deflects the image light LL is provided, a frame-shaped support section 23 which is provided around the moving section 22, shaft sections 24A and 24B which couple the moving section 22 to the support section 23 and support the moving section 22 so as to be able to swing (rotate) with respect to the support section 23, and a drive mechanism (actuator) 3 which swings the moving section 22 with respect to the support section 23. The optical path deflecting element 2 with a configuration described above is disposed in the projector 1 in such a manner that the +z side faces the dichroic prism 110 side, and the −z side faces the projection lens system 112 side.

The moving section 22 has a flat plate shape, and includes a via hole 221 in a central portion thereof. The glass plate 21 is fitted in the via hole 221, and the glass plate 21 adheres to the moving section 22 by an adhesive or the like. The via hole 221 has a step on a circumferential surface thereof, and receives the glass plate 21 in the step. Accordingly, the glass plate 21 is simply disposed in the moving section 22.

The glass plate 21 has a substantially rectangular plane shape, and is disposed in such a manner that a longitudinal direction thereof is substantially parallel to the x-axis direction. Since the posture of the glass plate 21 is changed, that is, an incident angle of the image light LL is changed, and thereby the glass plate 21 can deflect the image light LL that is incident and can make the image light pass therethrough. Thus, the posture of the glass plate 21 is changed to form a desired incident angle, and thus a deflection direction or an amount of deflection of the image light LL can be controlled. The size of the glass plate 21 is suitably set in such a manner that the image light LL which is emitted from the dichroic prism 110 passes therethrough. It is preferable that the glass plate 21 is substantially colorless and transparent. An anti-reflection film may be formed on the glass plate 21 on a surface on an incident side and a surface on an emission side of the image light LL.

A configuration material of the glass plate 21 is not particularly limited, but various types of glass materials, such as borosilicate glass, white plate glass, or quartz glass can be used as the configuration material. In the present embodiment, the glass plate 21 can be used as an optical section, but the optical section is not particularly limited, if the optical section is configured by a material with light-transmitting property. The optical section may be configured by various types of crystalline materials such as quartz crystal or sapphire, various types of resin materials such as polycarbonate resin or acrylic resin, or the like. However, it is preferable that the glass plate 21 is used as the optical section in the same manner as in the present embodiment. Accordingly, the rigidity of the optical section particularly increases, and thus it is possible to particularly reduce irregularities of light deflection which is deflected in the optical section.

The frame-shaped support section 23 is provided around the moving section 22 by which the glass plate 21 is supported, and the moving section 22 and the support section 23 are coupled to each other by the shaft sections 24A and 24B. The shaft sections 24A and 24B are shifted in the x-axis direction and the y-axis direction in a planar view, and form a swing axis J of the moving section 22. Accordingly, the moving section 22 swings around the swing axis J which is tilted at approximately 45 degrees with respect to both axes of the x-axis and the y-axis, and the posture of the glass plate 21 is changed by the swinging. Particularly, in the optical path deflecting element 2, the shaft sections 24A and 24B are disposed in point symmetry with respect to the center of the glass plate 21, in a planar view, and thus swing balance of the moving section 22 (glass plate 21) is improved.

As described above, the moving section 22, the support section 23, and the shaft sections 24A and 24B are configured as one piece (integrally formed). Accordingly, impact resistance and long-term durability of a boundary portion between the support section 23 and the shaft sections 24A and 24B, or a boundary portion between the shaft sections 24A and 24B and the moving section 22, is increased.

The moving section 22, the support section 23, and the shaft sections 24A and 24B are configured by a material with a Young's modulus smaller than that of a configuration material of the glass plate 21. It is preferable that the configuration material contains a resin, and it is more preferable that the configuration material contains a resin as a main component. Accordingly, it is possible to effectively prevent stress which is generated according to the swinging of the moving section 22 leading to unwanted vibration of the glass plate 21 itself. Side surfaces of the glass plate 21 can be surrounded by the moving section 22 with a relatively small Young's modulus. When the posture of the glass plate 21 is changed, it is possible to reduce the stress which is generated in the glass plate 21, and to reduce unwanted vibration which is generated in the glass plate 21 according to a stress distribution. As a result, it is possible to prevent an image which is deflected by the glass plate 21 from being deflected in an unintended direction.

The resin is not particularly limited, and polyethylene, polypropylene, silicone, polyacetal, polyamide, polycarbonate, polyphenylene ether, polyethylene terephthalate, polybutylene terephthalate, polyarylate, polysulfone, polyether sulfone, polyphenylene sulfide, polyether ether ketone, polyimide, polyether imide, fluorocarbon resin, or the like is used as the resin, and a material containing at least one type of the materials is used as the resin.

Next, the drive mechanism 3 which swings the moving section 22 will be described. The drive mechanism 3 is an electromagnetic actuator which includes a permanent magnet 31, a coil 32, and a voltage applying unit 33 that generates an electric field acting on the magnet 31 from the coil 32 by applying a drive signal that is an alternating voltage to the coil 32. Since an amount of power strong enough to swing the moving section 22 can be generated by using an electromagnetic actuator as the drive mechanism 3, it is possible to smoothly swing the moving section 22.

The permanent magnet 31 is provided on an edge section of the moving section 22, and forms a longitudinal shape along the y-axis direction. The permanent magnet 31 is magnetized in the z-axis direction (a thickness direction of the moving section 22). The permanent magnet 31 is not particularly limited, and may use a neodymium magnet, a ferrite magnet, a samarium-cobalt magnet, an alnico magnet, or the like.

Meanwhile, the coil 32 is fixed to the support section 23 via a holding member (coil holding member) 26, so as to face the permanent magnet 31 in the z-axis direction. In other words, the permanent magnet 31 is positioned on one side of the coil 32, and the holding member 26 is positioned on the other side (side opposite to the permanent magnet 31) of the coil 32. The coil 32 is an air core coil of a cylindrical shape, and a part of the permanent magnet 31 is inserted inside the coil 32. Accordingly, an electric field which is generated from the coil 32 can efficiently act on the permanent magnet 31. It is possible to achieve a low profile of the optical path deflecting element 2.

Disposition of the coil 32 is not particularly limited, if an electric field can act on the permanent magnet 31. In the present embodiment, the drive mechanism 3 is provided as a type in which the permanent magnet 31 is disposed in the moving section 22, that is, a so-called "moving magnet type", but the permanent magnet 31 and the coil 32 may be reversely disposed. That is, the drive mechanism 3 of a so-called "moving coil type" in which the coil 32 is disposed in the moving section 22 may be provided. However, by providing the drive mechanism 3 of a "moving magnet type" in the same manner as in the present embodiment, heat of the coil 32 which is generated by conduction is hardly transferred to the moving section 22 or the glass plate 21, and it is possible to efficiently reduce a change (change of resonance frequency) of vibration characteristics due to heat, bending of the glass plate 21, or the like.

The drive mechanism 3 having a configuration described above swings the moving section 22 as follows. If a drive signal is not applied to the coil 32 from the voltage applying unit 33, the moving section 22 is substantially parallel to an xy plane. If the drive signal is applied to the coil 32 from the voltage applying unit 33, the moving section 22 swings (rotates) around the swing axis J with respect to the support section 23, in such a manner that a state illustrated in FIG. 6A and a state illustrated in FIG. 6B are repeated. By the swinging of the moving section 22 an optical axis of the image light LL is shifted, and the image is alternately displayed in the image display positions P1 and P2. Thus, pixels increase in appearance, and a high resolution of the image is achieved (refer to FIG. 2).

The drive mechanism 3 which is driven in this way, is not configured to include a plurality of permanent magnets 31 and coils 32, but is configured to include one permanent magnet 31 and one coil 32. The optical path deflecting element which is configured to include a plurality of permanent magnets and a plurality of coils needs a balance of disposition or the like of the plurality of permanent magnets and a plurality of coils in order to stably swing the moving section, but the optical path deflecting element 2 including one permanent magnet 31 and one coil 32 does not need to do so. For this reason, it is possible to stably swing the drive mechanism 3, and thus it is further possible to increase stability of an optical path of the image light LL which passes through the glass plate 21. Since one permanent magnet 31 and one coil 32 are provided, the number of components of the optical path deflecting element 2 can be reduced, and thus it is possible to miniaturize the optical path deflecting element 2.

The optical path deflecting element 2 has characteristics thereof in the configuration of the holding member 26, in such a manner that the coil 32 can be suitably disposed with respect to the permanent magnet 31. Hereinafter, the holding member 26 will be described in detail.

As described in FIG. 7 and FIG. 8, the holding member 26 is a member with a flat plate shape, and includes a holding section 261 whose plane shape is a rectangular shape, and two fixing sections 262 which respectively protrude toward an outer side of the holding section 261 from two edges along a lateral direction of the holding section 261. The holding member 26 is mounted in (fixed to) the support section 23 by being screwed to the fixing section 262 using two screws 264, in a state in which the coil 32 is fixed to a lower surface (surface on −z side) of the holding section 261 by an adhesive or the like.

As illustrated in FIG. 7 and FIG. 8, a plurality (two in the present embodiment) of window sections 263A and 263B are provided in the holding member 26. The window sections 263A and 263B are penetration holes which penetrate the holding section 261 in the thickness direction. The window sections 263A and 263B can be formed by cutting, laser processing, or the like.

As described in FIG. 8, the window section 263A is formed in a position corresponding to an angle section 321A of an inner edge 321 of the coil 32 which is fixed to the holding section 261, and the angle section 321A is viewable through a part of the window section 263A. Through the window section 263A, it is possible to view an angle section 311A of the permanent magnet 31 which approaches the angle section 321A, in a state (mounted state) in which the holding member 26 is mounted in the support section 23. The angle section 321A may be configured by an outline of a straight line, and may be configured to include a curve, such as, a round outline. The angle section whose outline is round means a curved section which connects two sides adjacent to each other, among the sides configuring inner edges. "Angle sections (angle sections other than the angle section 321A of the inner edge 321 of the coil 32, an angle section of the outer edge 322 of the coil 32, and an angle section of the outer edge 311 of the permanent magnet 31)" are the same as in the above description.

Meanwhile, the window section 263B is formed in a position corresponding to an angle section 321B diagonally facing the angle section 321A, and the angle section 321B is viewable through a part of the window section 263B. Through the window section 263B, it is possible to view an angle section 311B of the permanent magnet 31 which approaches the angle section 321B, in the mounted state.

Flat areas (opening areas) of the window sections 263A and 263B are not particularly limited, but it is preferable that the flat areas are respectively and approximately 0.01 mm$^2$ to 25 mm$^2$, and it is more preferable that the flat areas are respectively and approximately 0.1 mm$^2$ to 5 mm$^2$. If the sizes of the window sections 263A and 263B are within the range, both the coil 32 and the permanent magnet 31 are more easily viewed, in the mounted state, and thus a positional relationship between those is more easily graspable. It is possible to suppress a mechanical strength of the holding member 26 from decreasing since the window sections 263A and 263B are too large.

By providing the window sections 263A and 263B having the configuration described above, the holding member 26 can be mounted in the support section 23, while a relative position of the coil 32 with respect to the permanent magnet 31 is grasped.

In this mounting, after a position in which the coil in the holding member 26 is fixed is determined, the penetration holes are formed in the positions in which two angle sections 321A and 321B of the coil 32 are viewed through the penetration holes, and thereby the window sections 263A and 263B are obtained. At this time, the window sections 263A and 263B are formed to the extent that the angle sections 311A and 311B of the permanent magnet 31 are viewable through the window sections 263A and 263B, in the mounted state.

Subsequently, the coil 32 is fixed to the holding member 26. Accordingly, the angle sections 321A and 321B of the coil 32 are viewable through the two window sections 263A and 263B.

Next, the holding member 26 to which the coil 32 is fixed is disposed in such a manner that the coil 32 faces the moving section 22. In a state of being disposed as described above, while moving the holding member 26 within a plane (xy plane) including the x-axis and the y-axis, the holding member 26 is moved (shifted) to a position in which the permanent magnet 31 is viewable through the two window sections 263A and 263B. Furthermore, the holding member 26 is moved in such a manner that a relative position of the coil 32 with respect to the permanent magnet 31 which is viewable through the window section 263A, and the relative position which is viewable through the window section 263B are even or as close as possible. Accordingly, the holding member 26 is disposed in a position in which the center of the coil 32 and the center of the permanent magnet 31 coincide with each other or are overlapped with each other if possible in a planar view.

Subsequently, while the disposition described above is maintained, the holding member 26 is screwed, thereby becoming fixed to the support section 23. When screwing, the fixing is made while a positional relationship (for example, separated distance or the like) between the permanent magnet 31 is confirmed in the position, and the coil 32 is confirmed, through the window sections 263A and 263B. Accordingly, the coil 32 can be disposed in a position in which the center of the coil 32 and the center of the permanent magnet 31 are overlapped with each other if possible in a planar view. Accordingly, the holding member 26 can be mounted (fixed) to the support section 23.

In this way, by providing the window sections 263A and 263B, the coil 32 can be provided in a suitable position with respect to the permanent magnet 31. For this reason, when the moving section 22 swings (rotates), it is possible to prevent the permanent magnet 31 from coming into contact with the coil 32, and thus stability of the swing of the moving section 22 can be increased. Thus, it is possible to further increase the stability of an optical path of light which is emitted from the glass plate 21. By a relatively simple configuration in which the window sections 263A and 263B are provided, the relative position of the coil 32 is graspable, and thus, it is possible to reduce the time for disposing the coil 32, and as a result, it is possible to increase productivity of the optical path deflecting element 2.

Particularly, as described above, the window sections 263A and 263B are provided in positions in which both the coil 32 and the permanent magnet 31 can be respectively viewed through the window sections 263A and 263B, and are formed to the extent that both the coil 32 and the permanent magnet 31 are viewable through the window sections 263A and 263B. Thus, it is possible to more easily grasp the relative position of the coil 32 with respect to the permanent magnet 31. For this reason, it is possible to more reliably dispose the coil 32 in a suitable position.

The window sections 263A and 263B are provided in positions corresponding to the angle sections 321A and 321B which face each other in one diagonal line of the coil 32, and thus it is possible to easily and reliably grasp the relative position of the entire circumference of the coil 32. For this reason, the coil 32 is very easily disposed in a suitable position. Furthermore, even if a plurality of optical path deflecting elements 2 are manufactured, it is possible to prevent disposition of the coil 32 between the optical path deflecting elements 2 from varying, and it is also possible to increase the yield.

In the description described above, the two window sections 263A and 263B are respectively provided in positions corresponding to the angle sections 321A and 321B of the coil 32, but the window sections 263A and 263B are not limited to the positions described above, if the relative position of the coil 32 can be confirmed. Although being not provided in the angle sections 321A and 321B facing each other, the window sections 263A and 263B are provided in two or more positions which are different from one another in the coil 32, and thus it is possible to more easily grasp the relative position in the entire circumference of the coil 32.

As described above, in the optical path deflecting element 2, a part of the permanent magnet 31 overlaps the coil 32 in a sectional view. There is a high possibility that the optical path deflecting element 2 having a configuration described above is in contact with the permanent magnet 31, in a sectional view, when the coil 32 is disposed, compared to the configuration in which the permanent magnet 31 and the coil 32 do not overlap each other. For this reason, if the optical path deflecting element 2 has a configuration in which a part of the permanent magnet 31 overlaps the coil 32 in a sectional view, it is possible to obtain a particularly remarkable effect in which the relative position of the coil 32 is graspable through the window sections 263A and 263B, as described above.

In the description, the two window sections 263A and 263B are respectively penetration holes, but may be notches of a slit shape, or the like. The window sections 263A and 263B may respectively have a configuration in which a transparent flat plate, such as plastic or glass is mounted on an opening of a penetration hole, or may have a configuration in which a lens is mounted on the opening of the penetration hole and the coil 32 is viewable in an enlarged manner. However, the window sections 263A and 263B configured by penetration holes can be easily formed, and variation of the configuration of the window sections 263A and 263B between the optical path deflecting element 2 can be easily reduced. For this reason, it is possible to particularly contribute to an increase of productivity of the optical path deflecting element 2 and an increase of yield.

The planar shape of the window sections 263A and 263B is a circular shape, but the planar shape of the window sections 263A and 263B is not limited to this, and may be a rectangular shape, a polygonal shape, a semi-circular shape, or the like. A plurality of window sections 263A and 263B may have shapes or sizes different from one another.

If it is possible to view the relative position of the coil 32 through a window section, the number of window sections is not limited, and may be one, or three or more, but it is preferred to be a plurality (two or more). By providing a plurality of window sections, the relative position of the entire circumference of the coil 32 is easily graspable. If one window section is provided, the window section is preferred to be formed in such a manner that a different portion of the coil 32 is viewed through the one window section. As illustrated in FIG. 9, a window section 263 of a longitudinal shape is formed along one diagonal line of the holding section 261, a configuration in which the two angle sections 321A and 321B of the coil 32 are viewable through the window section 263 may be provided.

The holding member 26 having the configuration described above may be configured by a non-magnetic material. By configuring the holding member 26 using a non-magnetic material, the holding member 26 is able to prevent the drive force which is generated by the coil 32 and the permanent magnet 31 from being hindered. For this reason, it is possible to prevent unwanted vibration caused by the holding member 26 from being generated in the glass plate 21 which is swinging.

An alloy containing aluminum, titanium, copper, or any one of these, various metal materials such as austenitic-based stainless steel, various resin materials, various glass materials, various ceramic materials, or the like may be used as the non-magnetic material. It is preferable that the non-magnetic material is particularly aluminum or austenitic-based stainless steel SUS, and among these, and it is more preferable that the non-magnetic material is configured by aluminum. The aluminum or the austenitic-based stainless steel SUS superior has excellent heat conductivity, and thus it is possible to reduce the heat or the like which is generated by other members (the control circuit 120, the image signal processing circuit 122, or the like) in the projector 1, or the coil 32 is transferred to the holding member 26, the support section 23, or the like.

Second Embodiment

Next, an optical path deflecting element to which a second embodiment of the optical device according to the invention is applied will be described.

Figure 10A:
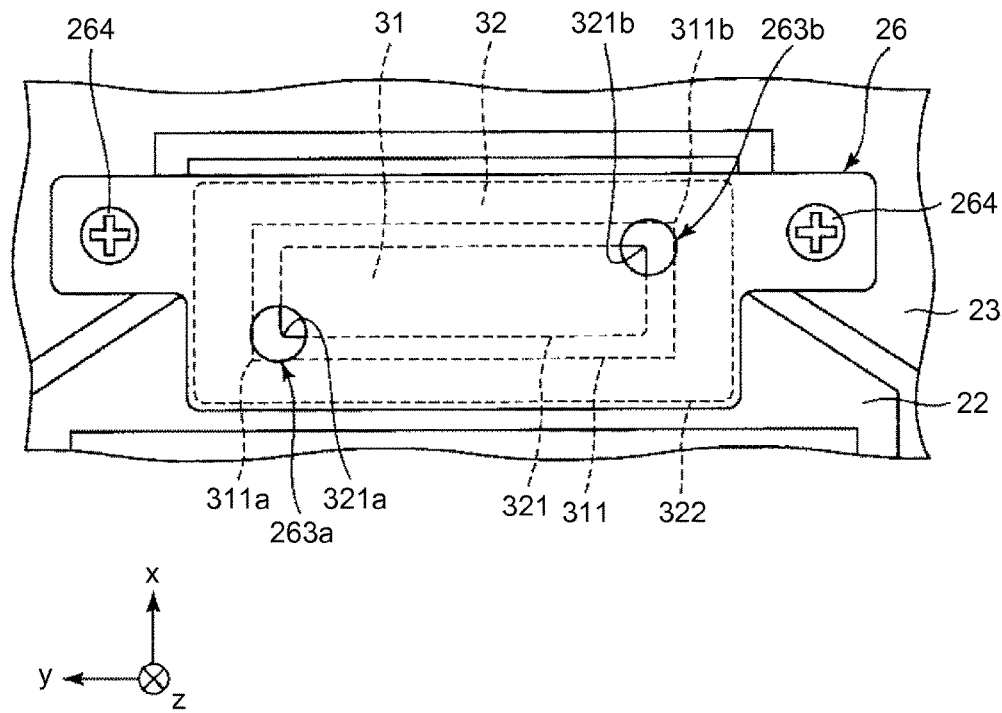
FIG. 10A is a partially enlarged plan view (rear view) of an optical path deflecting element included in a projector (image display device) according to a second embodiment of the invention.
Figure 10B:
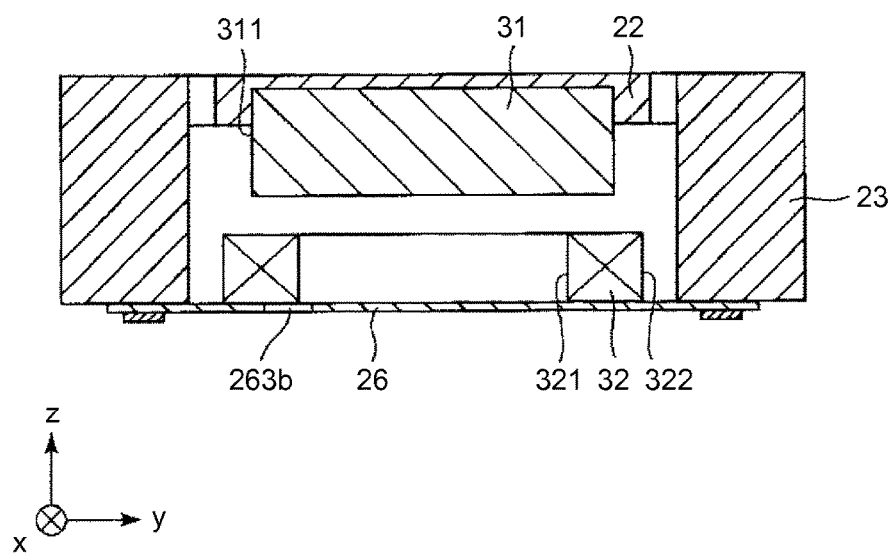
FIG. 10B is a sectional view of an optical path deflecting element included in a projector (image display device) according to a second embodiment of the invention.

FIG. 10A is a partially enlarged plan view (rear view) of an optical path deflecting element included in a projector (image display device) according to a second embodiment of the invention, and FIG. 10B is a sectional view of an optical path deflecting element included in a projector (image display device) according to a second embodiment of the invention. In FIGS. 10A and 10B, the same symbol or reference numerals will be attached to the same configurations as those of the embodiment described above.

The optical path deflecting element 2 according to the present embodiment is the same as the optical path deflecting element 2 according to the first embodiment, except that a configuration of the coil 32, and disposition of the coil 32 with respect to the permanent magnet 31 are different from those of the first embodiment.

The coil 32 included in the optical path deflecting element 2 illustrated in FIGS. 10A and 10B is configured in such a manner that external dimensions thereof are larger than external dimensions of the permanent magnet 31, and internal dimensions thereof are smaller than external dimensions of the permanent magnet 31. The coil 32 is disposed so as to face the permanent magnet 31 and to be separated from the permanent magnet 31 in a thickness direction (z-axis direction) of the permanent magnet 31. For this reason, as illustrated in FIG. 10A, an outer edge 311 of the permanent magnet 31 is positioned between an inner edge 321 and an outer edge 322 of the coil 32, in a planar view, and as illustrated in FIG. 10B, the coil 32 and the permanent magnet 31 do not overlap each other, in a sectional view.

If the coil 32 has the configuration illustrated in FIGS. 10A and 10B, the angle sections 311A and 311B of the permanent magnet 31 may not be viewed through the window sections 263A and 263B by existence of the coil 32, in a state in which the holding member 26 is disposed in the support section 23. In this case, after the holding member 26 is disposed in the support section 23, the holding member 26 is moved within the xy plane, the angle sections 311A and 311B of the permanent magnet 31 is in a state of being able to be viewed through the two window sections 263A and 263B, and a positional relationship between the permanent magnet 31 and the coil 32 is grasped. As described above, by taking the grasped positional relationship into account, the holding member 26 is moved again, and the holding member 26 is moved to a position in which the angle sections 311A and 311B cannot be viewed. Accordingly, the coil 32 can be disposed in a suitable position.

Also by confirming that the angle sections 311A and 311B of the permanent magnet 31 cannot be viewed through the two window sections 263A and 263B, it is possible to grasp that the outer edge 311 of the permanent magnet 31 is positioned between the inner edge 321 and the outer edge 322 of the coil 32.

The second embodiment described above also obtains the same actions and effects as the first embodiment.

Third Embodiment

Next, an optical path deflecting element to which the third embodiment of the optical device according to the invention is applied will be described.

Figure 11A:
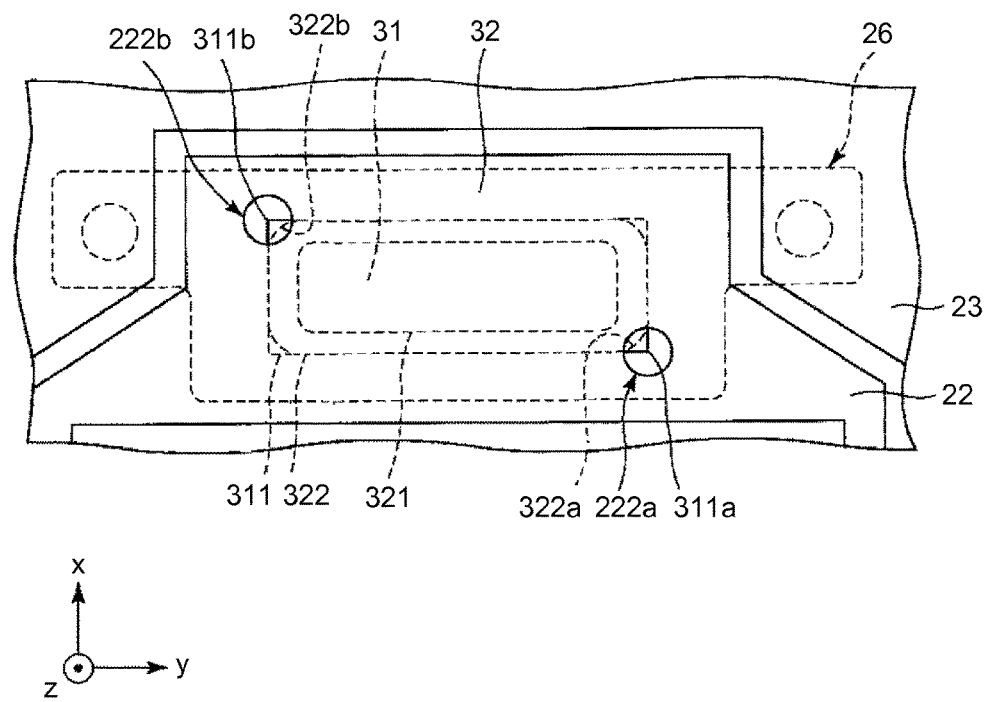
FIG. 11A is a partially enlarged plan view (top view) of an optical path deflecting element included in a projector (image display device) according to a third embodiment of the invention.
Figure 11B:
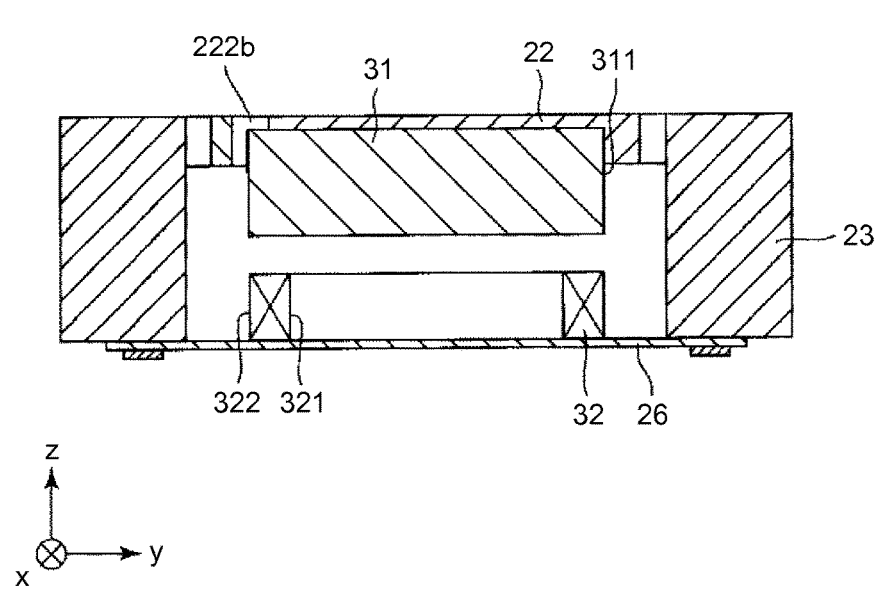
FIG. 11B is a sectional view of an optical path deflecting element included in a projector (image display device) according to a third embodiment of the invention.

FIG. 11A is a partially enlarged plan view (top view) of an optical path deflecting element included in a projector (image display device) according to a third embodiment of the invention, and FIG. 11B is a sectional view of an optical path deflecting element included in a projector (image display device) according to a third embodiment of the invention. In FIGS. 11A and 11B, the same symbols or reference numerals will be attached to the same configurations as in the embodiments described above.

The optical path deflecting element 2 according to the present embodiment is the same as the optical path deflecting element 2 according to the first embodiment, except that a configuration of the coil 32 and disposition of the coil 32 with respect to the permanent magnet 31 are different from those of the first embodiment, and furthermore, a configuration in which a window section is not provided in the holding member 26 and window sections 222A and 222B are provided in the moving section 22 is different from that of the first embodiment.

The coil 32 included in the optical path deflecting element 2 illustrated in FIGS. 11A and 11B is configured in such a manner that external dimensions thereof are substantially the same as external dimensions of the permanent magnet 31. The coil 32 is disposed so as to face the permanent magnet 31 and to be separated from the permanent magnet 31 in a thickness direction (z-axis direction) of the permanent magnet 31. For this reason, as illustrated in FIG. 11A, an outer edge 322 of the coil 32 and an outer edge 311 of the permanent magnet 31 substantially overlap each other, in a planar view, and as illustrated in FIG. 11B, the coil 32 and the permanent magnet 31 do not overlap each other, in a sectional view. By disposing the permanent magnet 31 and the coil 32 in this way, it is possible to further reduce a width (length in the y-axis direction) of the optical path deflecting element 2.

The window section 222A included in the moving section 22 is formed in a position corresponding to the angle section 311A of the permanent magnet 31, and as illustrated in FIG. 11A, the angle section 311A is viewable through a part of the window section 222A. Meanwhile, the window section 222B is formed in a position corresponding to the angle section 311B of the permanent magnet 31, and as illustrated in FIG. 11A, the angle section 311B is viewable through a part of the window section 222B.

If the coil 32 has the configuration illustrated in FIGS. 11A and 11B, the angle sections 322A and 322B of the outer edge 322 of the coil 32 may not be viewed through the window sections 222A and 222B by existence of the coil 32, in a state in which the holding member 26 is disposed in the support section 23. In this case, after the holding member 26 is disposed in the support section 23, the moving section 22 and the holding member 26 are moved within the xy plane, the angle sections 322A and 322B of the coil 32 are in a state of being able to be viewed through the two window sections 222A and 222B, and a positional relationship between the permanent magnet 31 and the coil 32 is grasped. As described above, by taking the grasped positional relationship into account, the moving section 22 or the holding member 26 is once again moved to a position in which the angle sections 322A and 322B cannot be viewed. Accordingly, the coil 32 can be disposed in a suitable position.

Also by confirming that the angle sections 322A and 322B of the coil 32 cannot be viewed through the two window sections 222A and 222B, it is possible to grasp that the outer edge 311 of the permanent magnet 31 and the outer edge 322 of the coil 32 substantially overlap each other in a planar view.

The same dispositions of the permanent magnet 31 and the coil 32 as the first and second embodiments can also be applied to the third embodiment described above.

As described above, the optical device and the image display device according to the invention are described based on the embodiments which are illustrated, but the invention is not limited to this. In the optical device and the image display device according to the invention, the configurations of the respective units and sections can be replaced with arbitrary configurations having the same functions, and other arbitrary configurations can be added to those.

In the embodiments described above, a configuration in which the glass plate with light-transmitting property is used as the optical section is described, but the optical section may be a mirror with light-reflecting properties. In this case, the optical device according to the invention can be used as an optical device for light-scanning, an optical switch, an optical attenuator, or the like.

In the embodiment described above, a liquid crystal projector is described as an image display device, but the image display device may be a projector of a light-scanning type using an optical device for light-scanning. The image display device is not limited to a projector, and in addition to this, can also be applied to a printer, a scanner, a head mount display (HMD), a head-up display (HUD), or the like.

The entire disclosure of Japanese Patent Application No. 2014-202405 filed Sep. 30, 2014 is expressly incorporated by reference herein.

What is claimed is:

1. An optical device comprising:
   an optical section that includes a light-incident surface on which light is incident;
   a moving section that supports the optical section;
   a shaft section that swingably supports the moving section around a swing axis;
   a permanent magnet that is provided in the moving section;
   an air core coil that is provided so as to face the moving section, and generates an electric field acting on the permanent magnet; and
   a coil holding member that is provided on a side opposite to the permanent magnet of the air core coil, and holds the air core coil,
   wherein the coil holding member includes a window section, and
   wherein an edge section of the air core coil is viewable through the window section.

2. The optical device according to claim 1,
   wherein the air core coil has an outer shape of a rectangular shape, in a planar view, and
   wherein the window section is provided in a position in which an angle section of the air core coil is viewable through the window section.

3. The optical device according to claim 2,
   wherein the window section is provided in a position in which a positional relationship between the permanent magnet and the air core coil is graspable through the window section.

4. The optical device according to claim 1,
   wherein the window section is provided in a position in which a positional relationship between the permanent magnet and the air core coil is graspable through the window section.

5. The optical device according to claim 1,
   wherein the window section is a penetration hole.

6. The optical device according to claim 1,
   wherein a plurality of the window sections are provided.

7. The optical device according to claim 6,
   wherein the plurality of the window sections are provided in positions through which sections different from one another are viewable.

8. The optical device according to claim 1,
   wherein the coil holding member is made of a non-magnetic material.

9. The optical device according to claim 1,
   wherein each of the moving section and the shaft section includes a resin material.

10. The optical device according to claim 1,
    wherein the optical section has light-transmitting property.

11. An image display device comprising:
    the optical device according to claim 1.

12. The image display device according to claim 11,
    wherein light is spatially modulated by the optical device, and a position of a pixel that is displayed by irradiation of the light is shifted.

13. An optical device comprising:
    an optical section that includes a light-incident surface on which light is incident;
    a moving section that supports the optical section;
    a shaft section that swingably supports the moving section around a swing axis;
    a permanent magnet that is provided in the moving section;
    an air core coil that is provided so as to face the moving section, and generates an electric field acting on the permanent magnet; and
    a coil holding member that is provided on a side opposite to the permanent magnet of the air core coil, and holds the air core coil,
    wherein the moving section includes a window section, and
    wherein an edge section of the permanent magnet is viewable through the window section.

14. The optical device according to claim 13,
    wherein the permanent magnet has an outer shape of a rectangular shape, in a planar view, and
    wherein the window section is provided in a position in which an angle section of the permanent magnet is viewable through the window section.

15. The optical device according to claim 14,
    wherein the window section is provided in a position in which a positional relationship between the permanent magnet and the air core coil is graspable through the window section.

16. The optical device according to claim 13,
    wherein the window section is provided in a position in which a positional relationship between the permanent magnet and the air core coil is graspable through the window section.

* * * * *